United States Patent [19]

Hahn

[11] Patent Number: 4,509,553
[45] Date of Patent: Apr. 9, 1985

[54] FLUID FLOW SELECTOR VALVE

[75] Inventor: Sangman Hahn, Kokomo, Ind.

[73] Assignee: General Motors Corporation, Detroit, Mich.

[21] Appl. No.: 528,742

[22] Filed: Sep. 2, 1983

[51] Int. Cl.³ .............................................. F15B 13/08
[52] U.S. Cl. .................................... 137/596; 137/353; 137/625.25; 137/884
[58] Field of Search ................ 137/596, 625.25, 637.1, 137/884, 353; 165/24, 42, 43; 62/161; 237/12.3 A

[56] References Cited

U.S. PATENT DOCUMENTS

| | | |
|---|---|---|
| 2,914,629 | 11/1959 | D'Aprile et al. |
| 2,940,465 | 6/1960 | Frantz ............................. 137/596 X |
| 2,966,032 | 12/1960 | Weymouth ................. 137/637.1 X |
| 2,996,081 | 8/1961 | Wise .............................. 137/637.1 X |
| 3,353,452 | 11/1967 | Beck et al. ................. 137/625.25 X |
| 3,731,729 | 5/1973 | Beatenbough et al. |
| 4,126,153 | 11/1978 | Raab ..................................... 137/353 |
| 4,139,020 | 2/1979 | Sebo ................................ 137/596 X |
| 4,212,322 | 7/1980 | Douglas et at. ............... 137/884 X |
| 4,291,725 | 9/1981 | Raab et al. ..................... 137/625.25 |
| 4,346,729 | 8/1982 | Franz ................................ 165/42 X |
| 4,448,390 | 5/1984 | Halstead et al. ............... 137/353 X |

Primary Examiner—Gerald A. Michalsky
Attorney, Agent, or Firm—R. L. Phillips

[57] ABSTRACT

A multimode push operated fluid flow selector valve is disclosed having modular construction including an individual slidable selector plate for each mode that is ported and cooperates with a common ported stator to effect the desired mode of communication.

3 Claims, 6 Drawing Figures

FLUID FLOW SELECTOR VALVE

This invention relates to fluid flow selector valves and more particularly to those of the push button sliding type.

In the control of fluid operated devices such as the vacuum motors used in vehicle air conditioning and heating systems, it is common practice to employ a sliding lever actuated rotary type valve or a plurality of push button operated solenoid valves to selectively connect the various vacuum morors with a vacuum source or potential and, alternatively, atmosphere (vent). While such control valves have generally proven satisfactory, they and/or their control arrangement are typically bulky and complex and have limited design flexibility in meeting various system requirements.

The present invention provides improvement over valves of the above type in the form of a multimode slide valve of modular construction of compact size which requires no motion transformation, e.g. linear to rotational, and minimal operator effort while providing extended design flexibility such that a wide range of logic can be designed in a manner similar to that of an electric circuit. In the preferred embodiment, the valve basically comprises a pressure potential passage (e.g. vacuum) and a plurality of communication passages (e.g. one for each vacuum motor) all formed in a single bus block. Identical groups of ports are then all formed in a single stator with the ports in each group corresponding with and separately connected to the pressure potential passage and the communication passages and with the number of groups corresponding to the number of different communication modes desired. An individual slidable selector plate is then provided for each group of ports (each mode) that is slidable between a position blocking all the ports in the respective group and a position separately connecting the pressure potential passage and atmosphere with one or more of the communication passages as desired via the ports in the respective group. To this end, each selector plate is formed with a differently patterned passage therein adapted to provide the desired mode of communication including that with atmosphere to effect venting.

These and other objects, advantages and features of the present invention will become more apparent from the following description and drawing in which.

Figure 1:
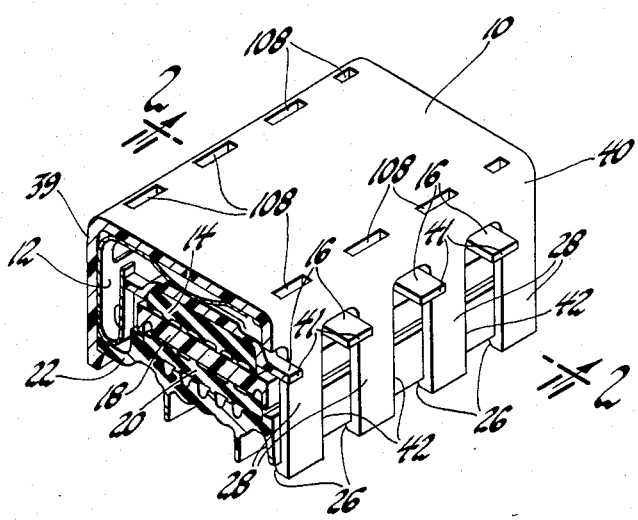
FIG. 1 is an isometric view with parts broken away of the preferred embodiment of the fluid flow selector valve according to the present invention.

Referring to the drawings, there is shown the preferred embodiment of the fluid flow selector valve according to the present invention as adapted for use as a dash mounted control valve in a vehicle heating, ventilating and air conditioning system to control communication of a vacuum source 1 and atmosphere with vacuum operated motors 2, 3, 4 and 5 that operate various devices in the system. The valve basically comprises a molded plastic housing 10, a metal pressure and return spring 12, a plurality of molded rubber selector plates 14 each with a molded plastic holder 16, a molded plastic stator plate 18, a molded rubber gasket 20 and a molded plastic bus block 22.

The housing 10 has a rectangular box shape with five integral sides while the sixth and open bottom side of the box is formed by the rectangularly shaped bus block 22 which is retained in place by having a periphery that snap fits past at the opposite long sides thereof and is then retained by inwardly projecting tangs 26 at the ends of downwardly depending spring arms 28 formed in the long vertical sides of the housing 10. Sandwiched between the flat ceiling 30 of the housing 10 and the flat interior or upper side 33 of the bus block 22 are the selector plate holders 16 each with their selector plate 14, the stator plate 18 and the gasket 20 in that order.

The pressure and return spring 12 is formed of stamped sheet metal with individual spring fingers 32 engaging a rib 34 on the top side of each holder 16 and individual spring fingers 36 engaging the inner end 38 of the holders. The spring fingers 32 each operate as a leaf spring between the ceiling 30 of the housing and the top side of their respective selector plate holder 16 to pressure the respective selector plate 14 against the stator plate 18 and the stator plate in turn against the gasket 20 and the gasket in turn against the interior side 33 of the bus block 22. The spring fingers on the other hand each operate against the one vertical housing wall 39 to individually normally hold their respective selector plate holder 16 against the opposite housing wall 40 in the solid-line position shown in FIG. 2 which shall be referred to as the disengaged position and permit individual leftward movement thereof to the phantom-line position which shall be referred to as the engaged position. To effect movement to their engaged position, the holders 16 at their opposite end 41 extend outward of the housing 10 in the slots 42 between the housing fingers 28 to permit pushing thereof by an operator. Then on release of each holder 16 it is returned by its spring finger 36 to its disengaged position where it buts and is held again against the end of its slot 42.

Figure 4:
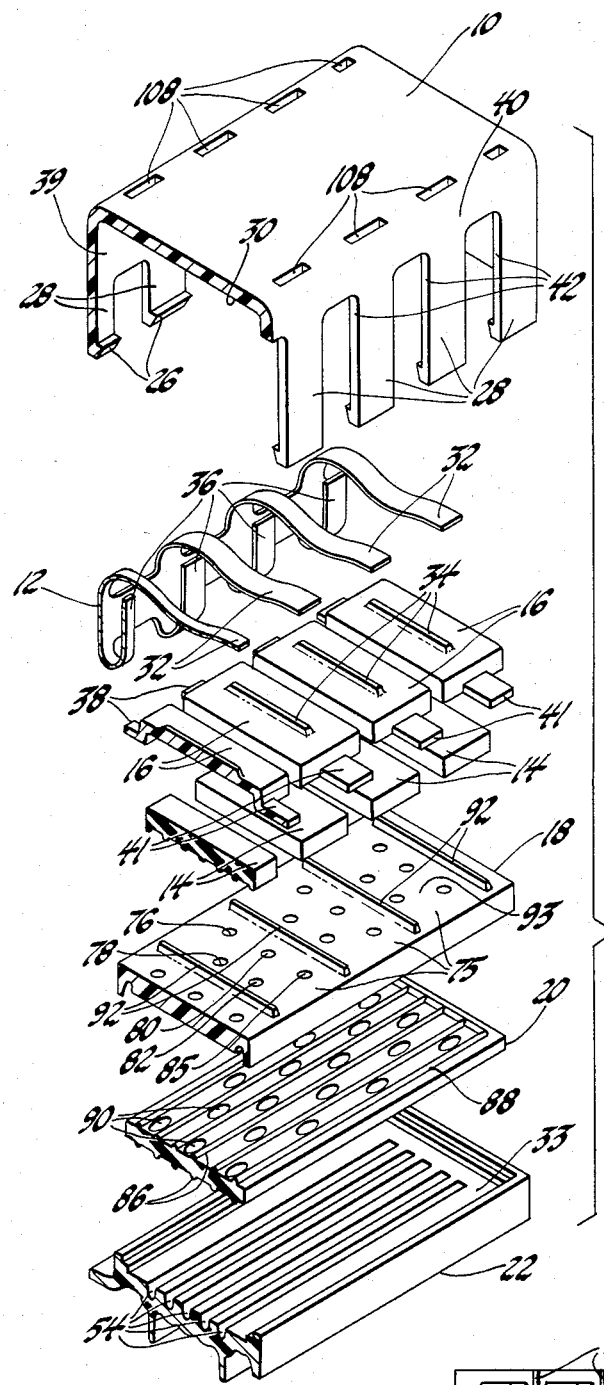
FIG. 4 is an isometric exploded view of the valve in FIG. 1.

The valve shown is adapted for installation in the dashboard of a vehicle to control a conventional heating, ventilation and air conditioning system having seven different modes of operation. For this purpose, they are provided seven individual selector plates 14, one for each mode; namely OFF (all systems off), MAX (maximum air conditioning), NORM (normal air conditioning), B/L (bi-level), VENT (ventilation), HTR (heating) and DEF (defrosting). To establish these different modes of operation, it is necessary that the vacuum source 1 and atmosphere (for venting) be selectively and alternately connected with one or more of the vacuum operated motors 2, 3, 4 and 5. To this end, the bus block 22 which because of its use here is also referred to as a vacuum bus block is provided with five identical, longitudinally extending and parallel straight channels 54 (see FIG. 4) which are closed by the gasket 20 so as to define straight and parallel passages 56, 58, 60, 62 and 64 (see FIG. 2) which extend substantially the length of the vacuum bus block.

Figure 2:
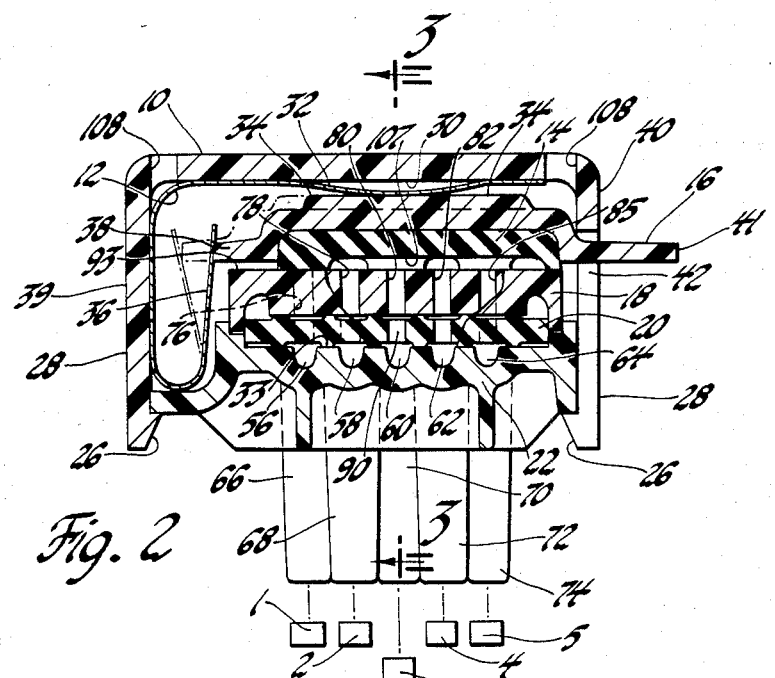
FIG. 2 is an enlarged sectional view taken along the line 2—2 in FIG. 1.
Figure 3:
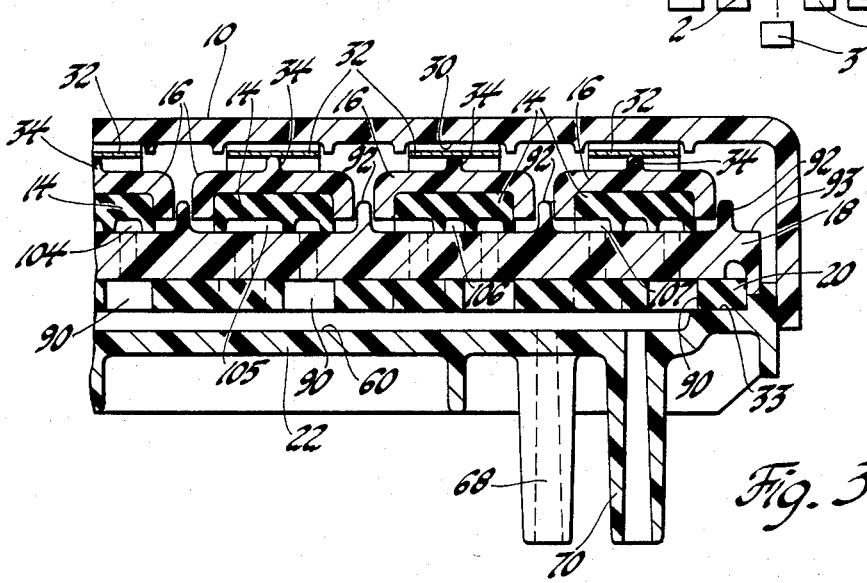
FIG. 3 is a sectional view taken along the line 3—3 in FIG. 2.

The passage 56 serves as a pressure potential passage, i.e. vacuum potential, and is connected to the vacuum source 1 by the formation of a nipple 66 extending downward from the bus block (see FIG. 2). On the other hand, the other passages 58, 60, 62 and 64 in the vacuum bus block serve as communication passages and are connected to the vacuum pressure operated motors 2, 3, 4 and 5 by the formation of additional nipples 68, 70, 72 and 74, respectively (see FIGS. 2 and 3). The rectangularly shaped stator plate 18 is then formed with seven identical groups 75 of five ports 76, 78, 80, 82 and 85 with the groups spaced longitudinally along the stator and with the ports in each group corresponding with and separately connected to the bus block passages, i.e. the port 76 in each group is open to passage 56, the port 78 in each group is open to passage 58, the port 80 in each group is open to passage 60, the port 82 in each group is open to passage 62 and the port 85 in each group is open to passage 64 (see FIGS. 2, 3 and 4). The rectangularly shaped gasket 20 is located between these ports and passages to seal their connection and to this end, the gasket is formed on each side with a sealing grip comprising a border sealing bead 88 and longitudinally extending sealing beads 86 located on opposite sides of the bus block passages. Within the grid, the gasket is formed with openings 90 with a minimum of one for each passage to permit such connections. The individual selector plates 14 for the different modes are guided by transverse ribs 92 formed on the upper side 93 of the stator plate at the boundaries of the port groups 75 and each selector plate is formed on its underside with a passage network or pattern that is specially designed to cooperate with the stator plate's upper side to effect the desired mode or manner of communication. For example, the seven designated modes of the system require that the selector valve provide the following logic to effect the desired operating results:

| MODE | OFF | MAX | NORM | B/L | VENT | HTR | DEF |
| --- | --- | --- | --- | --- | --- | --- | --- |
| Ports connected to port 76 | 80,85 | 78,80,82 | 80,82 | 80 | 80,82 | 80,85 | 85 |
| Ports to be vented to atmosphere | 78,82 | 85 | 78,85 | 78,82,85 | 78,85 | 78,82 | 78,80,82 |

Figure 5:
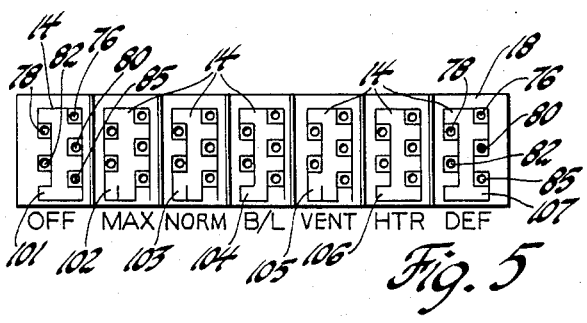
FIG. 5 is a diagrammatic view of the stator and selector plates in the valve in FIG. 1 with all the selector plates in their disengaged position.
Figure 6:
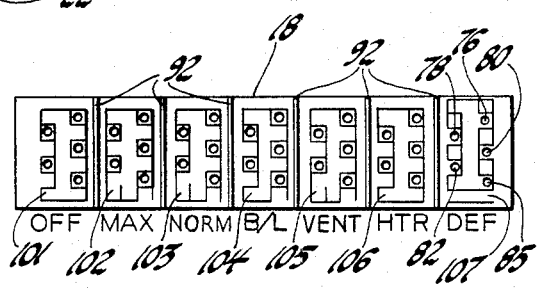
FIG. 6 is a view similar to FIG. 5 but with the DEF (defroster) selector plate moved to its engaged position.

Knowing such desired connections, the passageways in the individual selector plates are then simply formed as diagrammatically shown in FIG. 5 with the various patterns 101–107 selected to effect such connections when they are moved to their engaged position. As can be seen, the vacuum logics for NORM and VENT modes, and logics for OFF and HTR modes are identical in this example, but it will be understood that their electrical logics are different. And it will be observed that the selector plate passageway is also utilized to effect connection thereat with atmosphere for venting of the vacuum operated devices rather than requiring additional provision therefor in the stator plate and bus block. The venting is accomplished through the clearances between non-sealed parts. The slots 108 that are shown are for the molding tool to form the tangs 26 but it will be understood that the housing 10 may be modified for better enclosure and in that case, the slots may be excluded. By way of example of how a mode is selected and then effected, reference will be made to the DEF (defrost) mode wherein the selector plate communication pattern 107 is such that in the normal disengaged position of the DEF selector plate all the associated stator ports are blocked thereby as shown in FIG. 5. But then when the DEF selector plate is moved to its engaged position as shown in FIG. 6, only the port 85 in the associated stator group leading to vacuum motor 5 is connected to the vacuum potential port 76 which is open to the vacuum source 1 while the remaining ports 78, 80 and 82 in this group are blocked from connection with the vacuum source and are instead open to the atmosphere to thus vent the connected vacuum motors 2, 3 and 4. Having described the defroster mode, it will be readily understood that the remaining six modes are effected by the remaining respective selector plates in similar manner with their different communication patterns 101–106. Thus, it will be appreciated that the modular valve arrangement of the present invention enables each push-operated selector plate not only to have a simple pattern that allows a short travel (e.g. 3 mm) to effect a complex communication, but also to be compatible with conventional push-latch switches for other electrical system functions. Moreover, it will be appreciated that the flow control valve of the present invention is readily adapted to more or less modes in its application and that the pressure potential source could be a pressure above atmospheric as well as vacuum.

The above described preferred embodiment is thus illustrative of the invention which may be modified within the scope of the appended claims.

The embodiments of the invention in which an exclusive property or privilege is claimed are defined as follows:

1. A multimode slide valve comprising a complement of elongated side-by-side extending passages including a pressure potential passage and a plurality of communication passages, a plurality of groups of ports spaced along the length of said passages with the ports in each group being arranged in a prescribed pattern common to all the groups and so as to correspond with and be separately connected to said passages and with the number of said groups corresponding to a predetermined number of different modes of communication desired between said communication passages and said pressure potential passage and atmosphere, and individual slidable selector means for each said group slidable between a position blocking all the ports in the respective group and a position separately connecting said pressure potential passage and atmosphere with a prescribed number of said communication passages via the ports in the respective group, said selector means having differently patterned passage means adapted to cooperate with the ports in the respective groups to provide the desired mode of communication including that with atmosphere to effect venting.

2. A multimode slide valve comprising a bus block formed with a complement of straight parallel passages including a pressure potential passage and a plurality of communication passages, a stator formed with a plurality of groups of ports spaced along the length of said passages with the ports in each group being arranged in a prescribed pattern common to all the groups and so as to correspond with and be separately connected to said passages and with the number of said groups corresponding to a predetermined number of different modes of communication desired between said communication passages and said pressure potential passage and atmosphere, and an individual slidable selector plate for each said group slidable between a position blocking all the ports in the respective group and a position separately connecting said pressure potential passage and atmosphere with a prescribed number of said communication passages via the ports in the respective group, said selector plate having differently patterned passage means adapted to cooperate with the ports in the respective groups to provide the desired mode of communication including that with atmosphere to effect venting.

3. A multimode slide valve comprising a bus block formed with a complement of straight parallel passages including a pressure potential passage and a plurality of communication passages, a stator formed with a plurality of groups of ports spaced along the length of said passages with the ports in each group being arranged in a prescribed pattern common to all the groups and so as to correspond with and be separately connected to said passages and with the number of said groups corresponding to a predetermined number of different modes of communication desired between said communication passages and said pressure potential passage and atmosphere, an individual slidable selector plate for each said group slidable between a disengaged position blocking all the ports in the respective group and an engaged position separately connecting said pressure potential passage and atmosphere with a prescribed number of said communication passages via the ports in the respective group, said selector plates having differently patterned passage means adapted to cooperate with the ports in the respective groups to provide the desired mode of communication including that with atmosphere to effect venting, and a spring member having individual spring fingers separately pressuring said selector plates against said stator and further having individual spring fingers for returning said selector plates from their engaged to their disengaged position.

* * * * *